(12) United States Patent
Hirose et al.

(10) Patent No.: US 10,055,021 B2
(45) Date of Patent: Aug. 21, 2018

(54) ELECTRONIC DEVICE

(71) Applicant: Panasonic Intellectual Property Management Co., Ltd., Osaka (JP)

(72) Inventors: Yoshifumi Hirose, Kyoto (JP); Shoichi Araki, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 102 days.

(21) Appl. No.: 15/250,031

(22) Filed: Aug. 29, 2016

(65) Prior Publication Data

US 2016/0364001 A1 Dec. 15, 2016

Related U.S. Application Data

(63) Continuation of application No. PCT/JP2015/001323, filed on Mar. 11, 2015.

(30) Foreign Application Priority Data

Mar. 12, 2014 (JP) ................................. 2014-048369

(51) Int. Cl.
*G06F 3/041* (2006.01)
*G06F 3/01* (2006.01)
(Continued)

(52) U.S. Cl.
CPC .............. *G06F 3/016* (2013.01); *G06F 3/038* (2013.01); *G06F 3/03547* (2013.01);
(Continued)

(58) Field of Classification Search
CPC ...... G06F 3/016; G06F 3/03547; G06F 3/038; G06F 3/041; G06F 3/0412; G06F 3/0414;
(Continued)

(56) References Cited

U.S. PATENT DOCUMENTS 8,325,144 B1 12/2012 Tierling et al.
2005/0146513 A1 7/2005 Hill et al.
(Continued)

FOREIGN PATENT DOCUMENTS

JP 2007-517318 6/2007
JP 2011-501296 1/2011
(Continued)

OTHER PUBLICATIONS

International Search Report dated May 26, 2015 in International (PCT) Application No. PCT/JP2015/001323.

*Primary Examiner* — Michael J Eurice
(74) *Attorney, Agent, or Firm* — Wenderoth, Lind & Ponack, L.L.P.

(57) ABSTRACT

An electronic device includes a panel which a user touches, a detector that detects the touch of the user on the panel, a vibrator that vibrates the panel, and a signal generator. The signal generator generates a signal for driving the vibrator, the signal including a drive signal that generates vibration of the panel and a suppression signal that suppresses inertial vibration of the panel. The suppression signal has a degree of suppression the inertial vibration that changes depending on a touch position detected by the detector.

22 Claims, 13 Drawing Sheets

(51) Int. Cl.
  *G06F 3/043* (2006.01)
  *G06F 3/038* (2013.01)
  *G06F 3/0354* (2013.01)
  *G06F 3/044* (2006.01)

(52) U.S. Cl.
  CPC ............ *G06F 3/044* (2013.01); *G06F 3/0412*
    (2013.01); *G06F 3/041* (2013.01); *G06F 3/043*
    (2013.01); *G06F 3/0414* (2013.01); *G06F*
    *3/0436* (2013.01); *G06F 2203/04105*
    (2013.01); *H04R 2400/03* (2013.01)

(58) Field of Classification Search
  CPC ........ G06F 3/043; G06F 3/0436; G06F 3/044;
    G06F 2203/04105; H04R 2400/03
  See application file for complete search history.

(56) References Cited

U.S. PATENT DOCUMENTS

| | | | |
|---|---|---|---|
| 2006/0119573 A1 | 6/2006 | Grant et al. | |
| 2008/0062151 A1* | 3/2008 | Kent | G06F 3/0418 345/177 |
| 2011/0012717 A1* | 1/2011 | Pance | G06F 3/016 340/407.2 |
| 2013/0127755 A1 | 5/2013 | Lynn et al. | |
| 2013/0229384 A1* | 9/2013 | Adachi | G06F 3/041 345/174 |
| 2013/0234994 A1* | 9/2013 | Hecht | G06F 3/043 345/177 |
| 2013/0234995 A1* | 9/2013 | Son | G06F 3/043 345/177 |
| 2014/0043272 A1 | 2/2014 | Okumura et al. | |
| 2014/0118307 A1* | 5/2014 | Berget | H03H 9/02535 345/177 |
| 2014/0132568 A1* | 5/2014 | Hirose | G06F 3/016 345/175 |
| 2015/0054770 A1 | 2/2015 | Taninaka et al. | |
| 2016/0162031 A1* | 6/2016 | Westerman | G06F 3/016 345/173 |

FOREIGN PATENT DOCUMENTS

| | | |
|---|---|---|
| JP | 2012-20284 | 2/2012 |
| JP | 2013-70134 | 4/2013 |
| WO | 2013/168338 | 11/2013 |
| WO | 2013/186847 | 12/2013 |
| WO | 2013/186850 | 12/2013 |

* cited by examiner

ELECTRONIC DEVICE

BACKGROUND

1. Technical Field

The present disclosure relates to an electronic device that presents tactile feeling to an operation of a user.

2. Description of the Related Art

Public terminals including a touch panel (for example, automatic teller machine (ATM), automatic ticket vending machine, or the like) have conventionally been used. In addition, personal devices including a touch panel (for example, a tablet PC, a smart phone, or the like) have become popular.

The touch panel is an input device that detects a touch on a panel as an input. Generally, the touch panel includes a liquid crystal display or an organic electro luminescence (EL) display, etc. In this case, the touch panel is also called a touch display or a touch screen. For example, the touch panel detects a touch of a user on a graphical user interface (GUI) object (for example, a button) displayed on a display region.

A user interface using such a touch panel has an advantage that flexibility in arrangement of the GUI object is high. However, in the user interface using a touch panel, feedback of feeling when a button is pressed is small as compared with a user interface using a conventional mechanical button. Accordingly, there is a problem that, when a user touches a touch panel, it is difficult to recognize whether the touch is detected correctly. In order to solve this problem, a method for vibrating a touch panel to present tactile feeling to the touch is proposed (for example, Japanese Translation of PCT Publication 2011-501296 (PTL 1)).

When a touch panel is vibrated, amplitude of the vibration may become large near a center of the touch panel, whereas amplitude of the vibration may become small near an end of the touch panel. In such a case, a user will have uncomfortable feeling because tactile feeling differs depending on a touch position. PTL 1 proposes to change a drive voltage for vibrating the touch panel depending on the touch position and to make vibration amplitude uniform.

SUMMARY

The present disclosure provides an electronic device with reduced uncomfortable tactile feeling.

An electronic device according to one exemplary embodiment of the present disclosure includes a panel which a user touches, a detector configured to detect the touch of the user on the panel, a vibrator configured to vibrate the panel, and a signal generator. The signal generator generates a signal for driving the vibrator, the signal including a drive signal that generates vibration of the panel and a suppression signal that suppresses inertial vibration of the panel. The suppression signal has a degree of suppression the inertial vibration that changes depending on a touch position detected by the detector.

A vibration control apparatus according to one exemplary embodiment of the present disclosure includes: a drive signal generator configured to generate a drive signal that drives a vibrator for generating vibration of a panel which a user touches; and a suppression signal generator configured to generate a suppression signal for suppression inertial vibration of the panel. The vibration control apparatus outputs the drive signal and the suppression signal to the vibrator. The suppression signal has a degree of suppression the inertial vibration that changes depending on a touch position of the user on the panel.

A method according to one exemplary embodiment of the present disclosure is a method for vibrating a panel of an electronic device. The method includes detecting a touch of a user on the panel, generating a signal for vibrating the panel, and vibrating the panel. The generated signal includes a suppression signal for suppression inertial vibration of the panel. The suppression signal has a degree of suppression the inertial vibration that changes depending on a touch position of the user on the panel.

A recording medium according to one exemplary embodiment of the present disclosure is a non-transitory computer-readable recording medium storing a computer program for causing an electronic device to execute a vibration operation. The computer program is a computer program for causing a computer of the electronic device to execute detecting a touch of a user on a panel of the electronic device, generating a signal for vibrating the panel, and vibrating the panel. The generated signal includes a suppression signal for suppression inertial vibration of the panel. The suppression signal has a degree of suppression the inertial vibration that changes depending on a touch position of the user on the panel.

DETAILED DESCRIPTION

An exemplary embodiment will be described in detail below with reference to the drawings as needed. However, a description more detailed than necessary may be omitted. For example, a detailed description of an already well-known item and a repeated description of substantially identical components may be omitted. This is for avoiding the following description from becoming unnecessarily redundant and for making the description easier for a person skilled in the art to understand.

It is to be noted that the present inventors provide the accompanying drawings and the following description in order for a person skilled in the art to fully understand the present disclosure, and do not intend to limit the subject described in the appended claims.

Exemplary Embodiment

In order to vibrate a panel, such as a touch panel, a drive signal is supplied to a vibrator provided in the panel, such as a piezoelectric element, and the vibrator is vibrated, thereby vibrating the panel. After the drive signal is supplied to the vibrator for a desired time period, the vibrator stops the vibration by a stop of the supply of the drive signal. At this time, even after the stop of the supply of the drive signal, the panel continues the vibration for a while because of inertia. This vibration caused by inertia is herein called "inertial vibration." The inertial vibration is gradually attenuated by factors such as internal loss of panel materials and air resistance, and eventually amplitude becomes zero.

Since such inertial vibration can be felt by a finger of a user who touches the panel, the user will have uncomfortable tactile feeling. In addition, if inertial vibration continues for a long time, this inertial vibration will affect a next panel operation quickly performed by the user, causing uncomfortable tactile feeling.

According to one exemplary embodiment of the present disclosure, suppression of inertial vibration of the panel reduces uncomfortable tactile feeling.

Hereinafter, the electronic device according to the exemplary embodiment will be described.

[1-1. Configuration of the Electronic Device]

Figure 1:
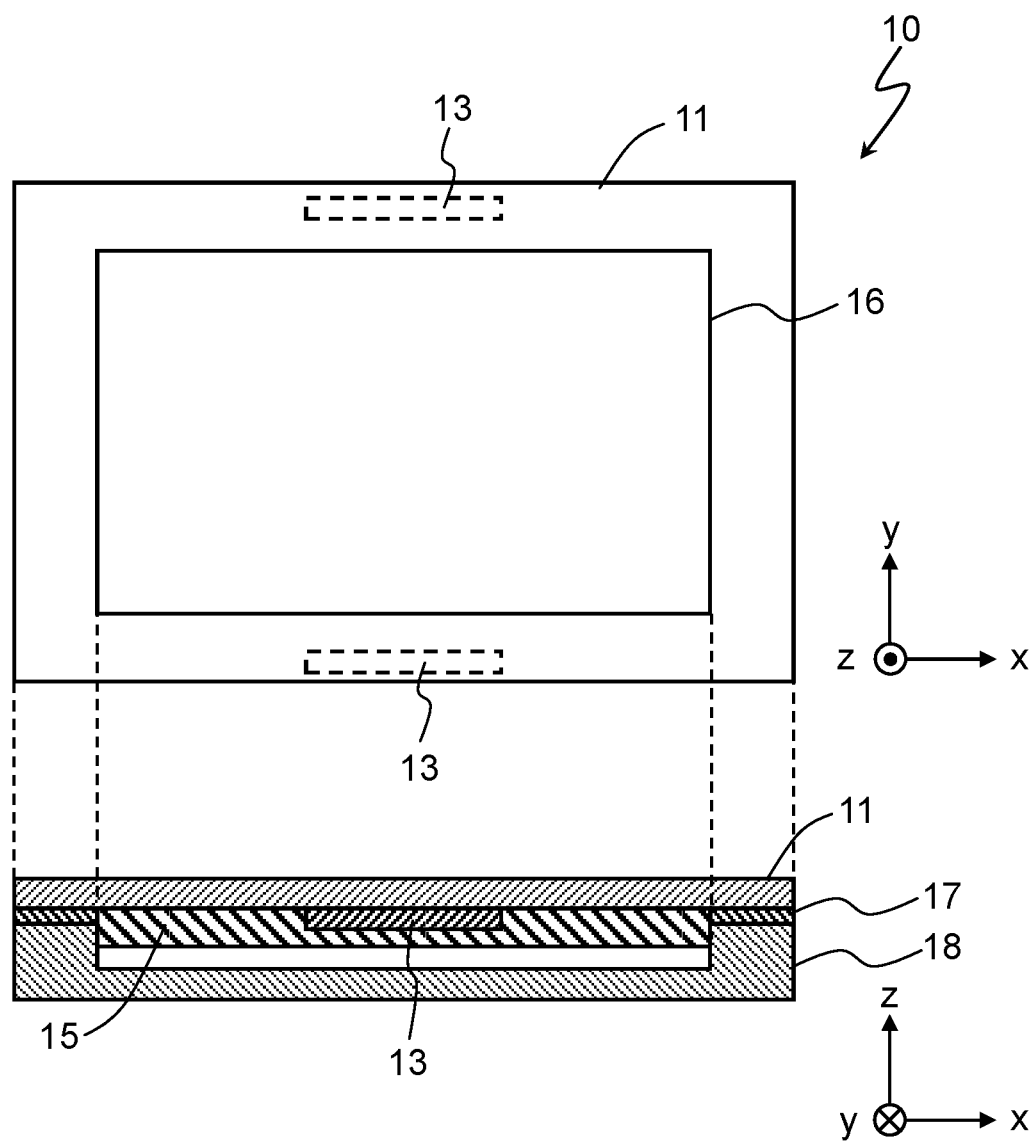
FIG. 1 is a two-view diagram illustrating a top view and a sectional view along a vibrator of an electronic device according to an exemplary embodiment.

FIG. 1 is a two-way diagram illustrating a top view and a sectional view along vibrator 13 of electronic device 10 according to the exemplary embodiment.

Figure 2:
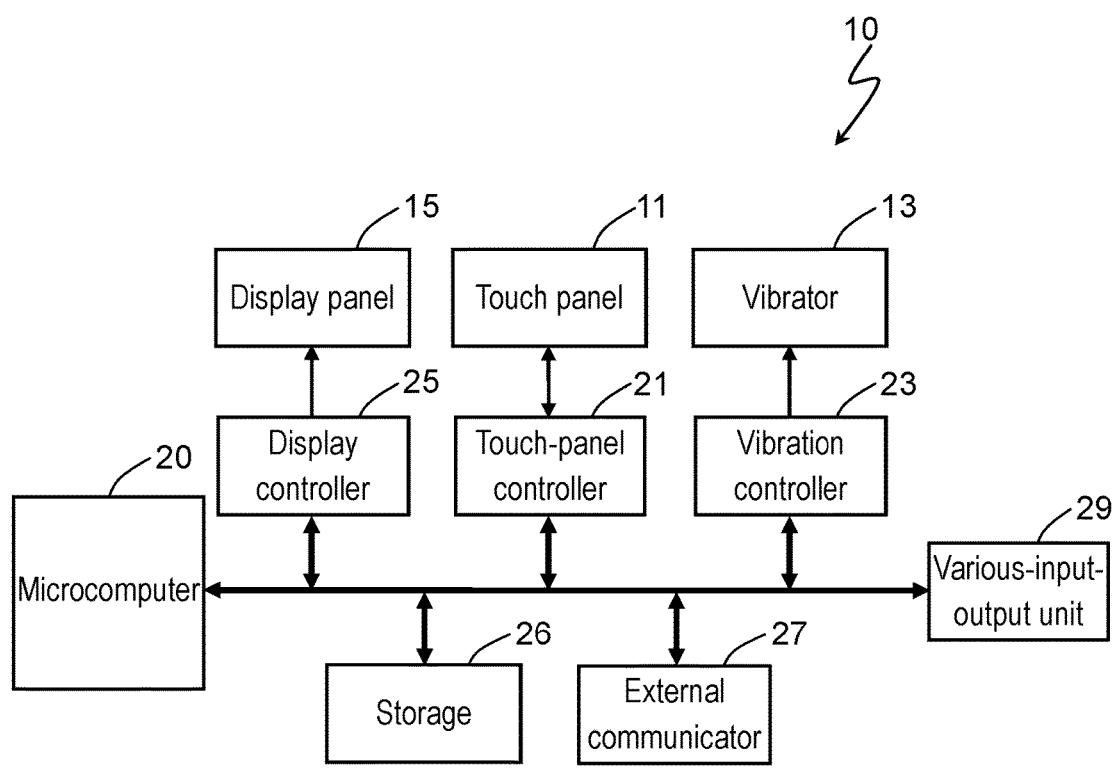
FIG. 2 is a block diagram illustrating the electronic device according to the exemplary embodiment.

FIG. 2 is a block diagram illustrating components of electronic device 10 according to the exemplary embodiment.

As illustrated in FIG. 1, electronic device 10 includes touch panel 11, vibrator 13, display panel 15, spacer 17, and enclosure 18.

Touch panel 11 is disposed to cover display region 16 of display panel 15. In touch panel 11, for example, a touch position is detected by detection of change in capacitance by a touch operation of a user. Note that, in this example, touch panel 11 is configured to cover an entire surface of display region 16 of an image of display panel 15. However, the present disclosure is not limited to this example, and touch panel 11 may be configured to cover at least part of display region 16.

Touch panel 11 is attached to enclosure 18 via spacer 17. Spacer 17 is, for example, a buffer member, such as silicon rubber, urethane rubber, and the like. Spacer 17 is fixed to touch panel 11 and enclosure 18 by using an adhesive, a double-sided tape, and the like.

Vibrator 13 is attached to a back of touch panel 11. Vibrator 13 is, for example, a piezoelectric element, and expands and contracts by application of a voltage, thereby, to generate flexural vibration. Vibrator 13 vibrates touch panel 11 in accordance with the drive signal. The vibration provided to touch panel 11 by vibrator 13 propagates to the touch position of the user on touch panel 11, whereby tactile feeling is presented to the user.

Note that, in the example illustrated in FIG. 1, a number of vibrator 13 is two, but the number of vibrator 13 may be one, and may be three or more.

Note that, in the present exemplary embodiment, vibrator 13 is provided on the back of touch panel 11, but vibrator 13 may be affixed to one of members that constitute electronic device 10, such as display panel 15, enclosure 18, and the like. In addition, a thin-film transparent piezoelectric member may be formed on touch panel 11 by methods such as sputtering, to be used as vibrator 13. In addition, in a case where a cover member, etc. is on touch panel 11, vibrator 13 may be affixed to the cover member.

Note that, in the case where the cover member is on touch panel 11, both touch panel 11 and the cover member are called a panel member that detects the touch position. In addition, vibrator 13 is not limited to the piezoelectric element, and for example, may be a vibrating motor.

As illustrated in FIG. 2, electronic device 10 further includes display controller 25 that controls display of display panel 15, touch-panel controller 21 that performs control of touch position detection of touch panel 11, and vibration controller 23 that controls vibration of vibrator 13. In addition, electronic device 10 further includes microcomputer 20, storage 26, external communicator 27 that performs communication with outside, and various-input-output unit 29 that performs various input and output.

Microcomputer 20 controls operations of overall electronic device 10. Microcomputer 20 performs control of operations such as detection, determination, and the like of various pieces of information, and operations of respective components.

Storage 26 is, for example, a hard disk or a semiconductor memory. Storage 26 stores various programs and various pieces of data.

External communicator 27 uses, for example, wireless local area network (LAN), such as Wi-Fi (registered trademark) or the like, and is connected in a state where interconnectivity between a plurality of electronic devices is verified. The connection between electronic devices may be methods such as a method for connection via external communication apparatuses, such as an access point or the like, or P2P (wireless ad hoc network) connection that is a method for direct connection without using external telecommunications apparatuses.

On display panel 15, an object for receiving input from the user is displayed, such as a character, a number, an icon, a keyboard, and the like. For example, when a keyboard is displayed on display panel 15, the user can perform character input, etc. by performing a touch operation at an arbitrary position of the keyboard. As display panel 15, for example, known display panels can be used, such as a liquid crystal method, an organic EL method, an electronic paper method, a plasma method, and the like.

Display controller 25 controls contents to be displayed on display panel 15 based on a control signal generated by microcomputer 20.

Note that, display panel 15 does not necessarily need to be installed in electronic device 10, and electronic device 10 may have a configuration that includes neither display panel 15 nor display controller 25.

Touch panel 11 outputs a signal corresponding to the touch position of the user to touch-panel controller 21.

Touch-panel controller 21 detects touch position (such as coordinates and the like) of the user. Touch-panel controller 21 functions as a detector that detects the touch position of the user. Touch-panel controller 21 outputs information on the touch position of the user to microcomputer 20, vibration controller 23, and the like.

As touch panel 11, for example, a touch panel of an electrostatic method, a resistor film method, an optical method, an ultrasonic method, an electromagnetic method, and the like can be used.

In addition, although touch panel 11 and display panel 15 are separate components in this example, touch panel 11 and display panel 15 may be integrally formed. Touch panel 11 and display panel 15 may employ, for example, methods such as an in-cell type touch panel that integrates a touch-panel function inside a liquid crystal panel, an on-cell type touch panel that integrates the touch-panel function on a surface of the liquid crystal panel, and the like.

In addition to the touch position of the user, touch-panel controller 21 may acquire information that indicates a contact area and pressing force at each touch position, etc. as touch information. The pressing force can be easily acquired, for example, when a touch panel of a pressure-sensitive method is used. In addition, the pressing force may be acquired by using a sensor such as a load cell and the like.

[1-2. Operation of Electronic Device]

Next, processing for suppression inertial vibration of touch panel 11 according to the present exemplary embodiment will be described.

Figure 3:
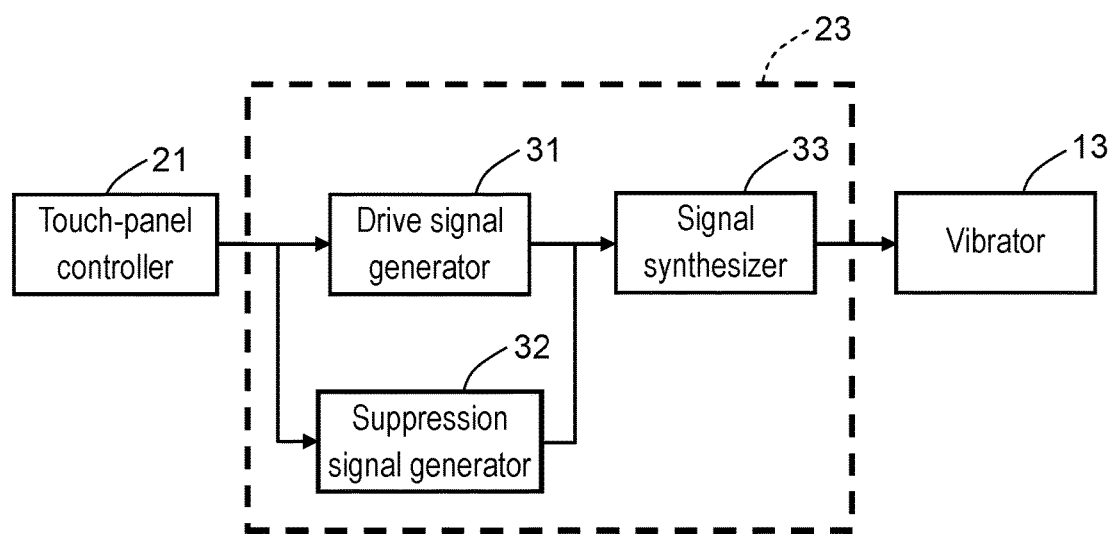
FIG. 3 is a block diagram illustrating a vibration controller according to the exemplary embodiment.

FIG. 3 is a block diagram illustrating vibration controller 23 according to the exemplary embodiment.

Figure 4:
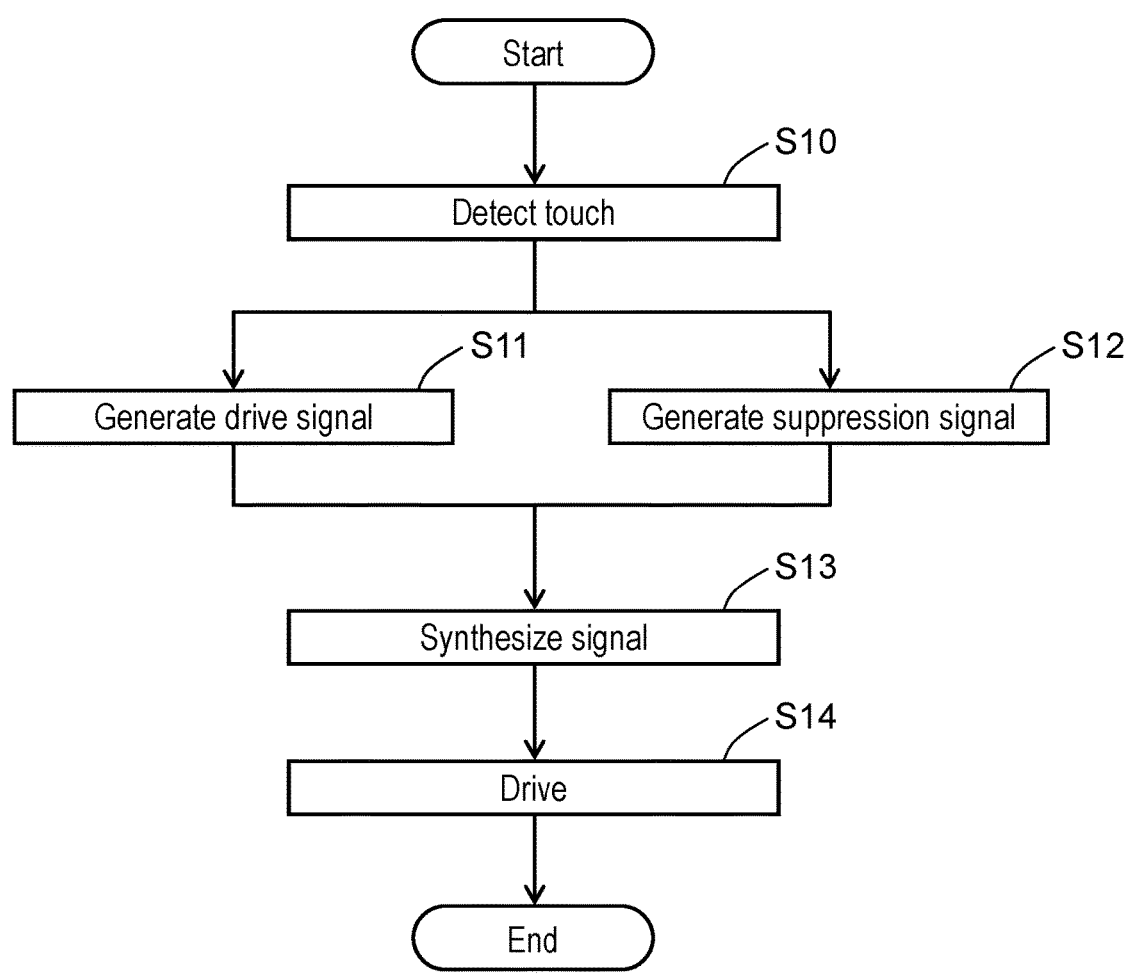
FIG. 4 is a flow chart illustrating an operation of the electronic device according to the exemplary embodiment.

FIG. 4 is a flow chart illustrating an operation of electronic device 10 according to the exemplary embodiment.

Figure 5:
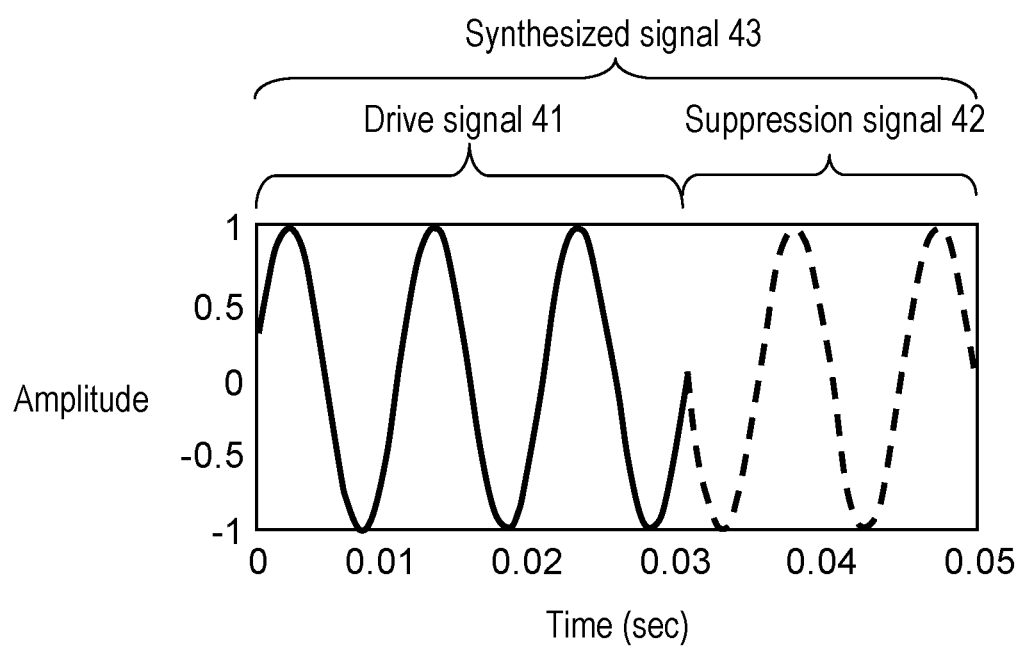
FIG. 5 is a diagram illustrating one example of a synthesized signal to be supplied from the vibration controller to the vibrator according to the exemplary embodiment.

FIG. 5 is a diagram illustrating synthesized signal 43 to be supplied from vibration controller 23 to vibrator 13 according to the exemplary embodiment.

Vibration controller 23 functions as a signal generator that generates a signal for driving vibrator 13. Vibration controller 23 includes drive signal generator 31, suppression signal generator 32, and signal synthesizer 33.

When detecting a touch of the user on touch panel 11, touch-panel controller 21 outputs information regarding the touch, such as the touch position, to vibration controller 23 (step S10).

Based on the information regarding the touch, drive signal generator 31 generates drive signal 41 that drives vibrator 13 in order to generate vibration of touch panel 11 (step S11).

In addition, based on the information regarding the touch, suppression signal generator 32 generates suppression signal 42 for suppression the inertial vibration of touch panel 11 (step S12).

Signal synthesizer 33 generates synthesized signal 43 obtained by synthesis of drive signal 41 and suppression signal 42, and then outputs synthesized signal 43 to vibrator 13 (step S13).

Vibrator 13 is driven by the synthesized signal and vibrates, and the vibration propagates to touch panel 11, thereby presenting tactile feeling to the user (step S14).

FIG. 5 is a diagram illustrating one example of synthesized signal 43 supplied from vibration controller 23 to vibrator 13 according to the exemplary embodiment. In FIG. 5, a vertical axis represents amplitude, whereas a horizontal axis represents time.

Synthesized signal 43 includes drive signal 41 and suppression signal 42. Drive signal 41 is first supplied to vibrator 13, and then vibrator 13 vibrates touch panel 11. Then, following drive signal 41, suppression signal 42 for suppression the inertial vibration of touch panel 11 is supplied to vibrator 13.

Suppression signal 42 differs from drive signal 41 in phase. For example, drive signal 41 is 180 degrees phase-shifted from suppression signal 42. Such suppression signal 42 drives vibrator 13 in a direction of canceling the inertial vibration of touch panel 11, weakening the inertial vibration of touch panel 11. This allows reduction in uncomfortable tactile feeling resulting from the inertial vibration. Note that a form of 180-degree phase shift is one example, and as long as the inertial vibration can be weakened, an amount of phase shift may be other than 180 degrees.

Figure 6A:
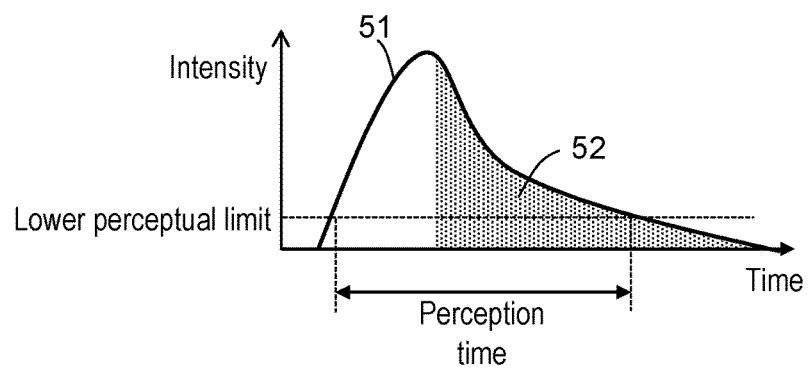
FIG. 6A is a diagram illustrating how vibration of a touch panel changes according to the exemplary embodiment.
Figure 6B:
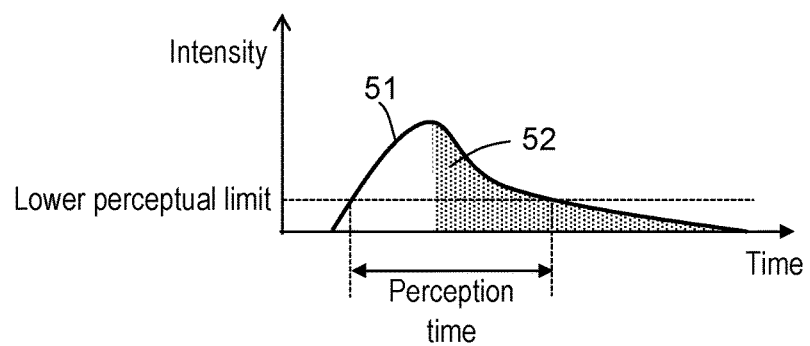
FIG. 6B is a diagram illustrating how the vibration of the touch panel changes according to the exemplary embodiment.
Figure 6C:
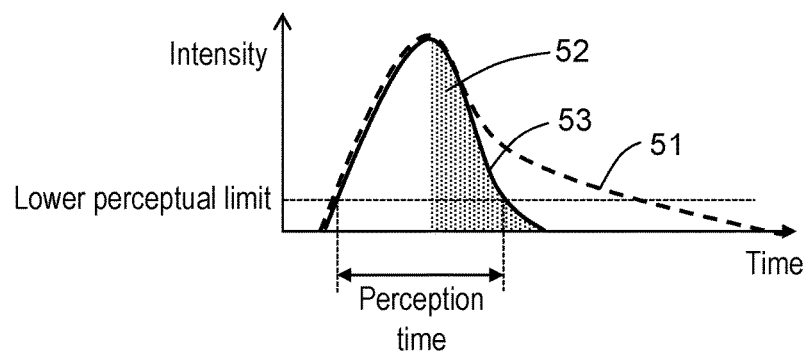
FIG. 6C is a diagram illustrating how the vibration of the touch panel changes according to the exemplary embodiment.
Figure 6D:
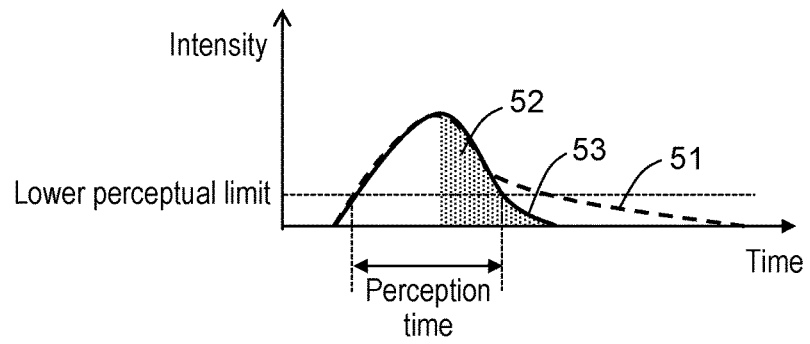
FIG. 6D is a diagram illustrating how the vibration of the touch panel changes according to the exemplary embodiment.

FIG. 6A to FIG. 6D are diagrams illustrating how vibration of touch panel 11 changes according to the exemplary embodiment. FIG. 6A and FIG. 6B illustrate a change in the vibration of touch panel 11 when vibrator 13 is driven by a signal including only drive signal 41 without including suppression signal 42. FIG. 6C and FIG. 6D illustrate a change in the vibration of touch panel 11 when vibrator 13 is driven by synthesized signal 43 including both drive signal 41 and suppression signal 42. In each of FIG. 6A to FIG. 6D, a vertical axis represents intensity of the vibration (amplitude) of touch panel 11, and a horizontal axis represents time.

As illustrated in FIG. 6A, when vibrator 13 is driven by a signal including only drive signal 41 without including suppression signal 42, vibration 51 is generated in touch panel 11. A dotted area illustrated in FIG. 6A indicates inertial vibration component 52 of touch panel 11 that continues even after the supply of drive signal 41 is stopped. In a section where vibration amplitude of touch panel 11 is larger than a lower perceptual limit, the user can perceive the vibration. Here, the lower perceptual limit is a lower limit of vibration amplitude the user can perceive. Since suppression signal 42 is not supplied to vibrator 13 in the example illustrated in FIG. 6A, a time period during which the amplitude of the inertial vibration is larger than the lower perceptual limit is longer and a perception time of the user is longer than in the example illustrated in FIG. 6C in which suppression signal 42 is supplied to vibrator 13.

FIG. 6B illustrates vibration 51 of touch panel 11 when drive signal 41 is smaller than drive signal 41 in the example illustrated in FIG. 6A. Since maximum amplitude of touch panel 11 is smaller in the example illustrated in FIG. 6B than in the example illustrated in FIG. 6A, the inertial vibration is attenuated more quickly, and the perception time is shorter than in the example illustrated in FIG. 6A. Since the perception time of the user differs significantly between the example illustrated in FIG. 6A and the example illustrated in FIG. 6B, the user will feel uncomfortable tactile feeling.

Meanwhile, as illustrated in FIG. 6C, when vibrator 13 is driven by synthesized signal 43 including both drive signal 41 and suppression signal 42, vibration 53 is generated in touch panel 11. In FIG. 6C, a dotted line illustrates vibration 51 for comparison. Since suppression signal 42 is supplied to vibrator 13 in the example illustrated in FIG. 6C, the inertial vibration is suppressed more and the amplitude of the inertial vibration that is larger than the lower perceptual limit is in a shorter time than in the example illustrated in FIG. 6A, which can shorten the perception time of the user. This allows the user to have less uncomfortable feeling because the inertial vibration is less likely to affect the next panel operation of the user when the user performs the next panel operation quickly.

FIG. 6D illustrates vibration 53 of touch panel 11 when drive signal 41 and suppression signal 42 are smaller than in the example illustrated in FIG. 6C. In both the example illustrated in FIG. 6C and the example illustrated in FIG. 6D, suppression signal 42 suppresses the inertial vibration. Accordingly, in the example illustrated in FIG. 6D, this can make the perception time of the user almost identical to the perception time in the example illustrated in FIG. 6C, and this allows the user to have less uncomfortable feeling in a similar manner to the example illustrated in FIG. 6C.

Next, one example of a relationship between a number of waves of drive signal 41 and a number of waves of suppression signal 42 will be described. FIG. 7A to FIG. 7G are diagrams illustrating how the vibration of touch panel 11 changes according to the exemplary embodiment, and how the vibration of touch panel 11 changes when the number of waves of suppression signal 42 is changed. In each of FIG. 7A to FIG. 7G, a vertical axis represents amplitude, and a horizontal axis represents time. In the examples illustrated in FIG. 7A to FIG. 7G, the number of waves of drive signal 41 is 3.0 waves (three cycles).

Figure 7A:
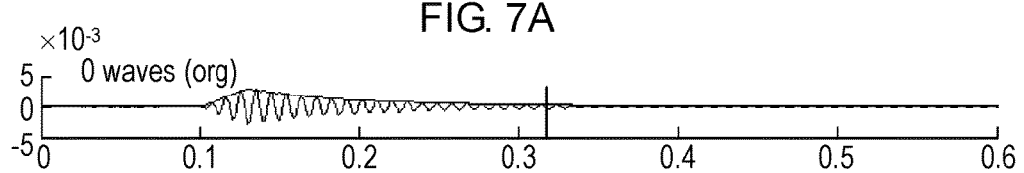
FIG. 7A is a diagram illustrating how the vibration of the touch panel changes according to the exemplary embodiment.
Figure 7B:
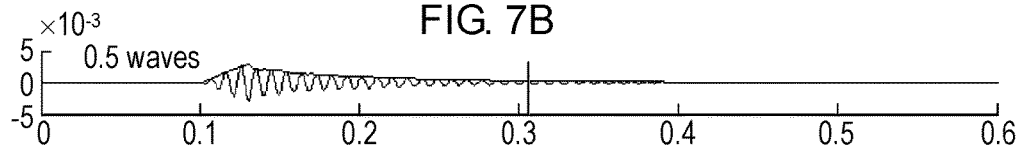
FIG. 7B is a diagram illustrating how the vibration of the touch panel changes according to the exemplary embodiment.
Figure 7C:
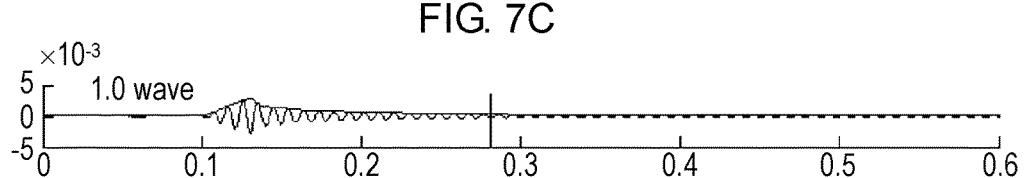
FIG. 7C is a diagram illustrating how the vibration of the touch panel changes according to the exemplary embodiment.
Figure 7D:
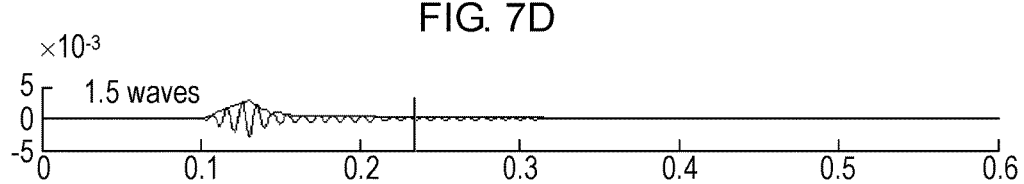
FIG. 7D is a diagram illustrating how the vibration of the touch panel changes according to the exemplary embodiment.
Figure 7E:
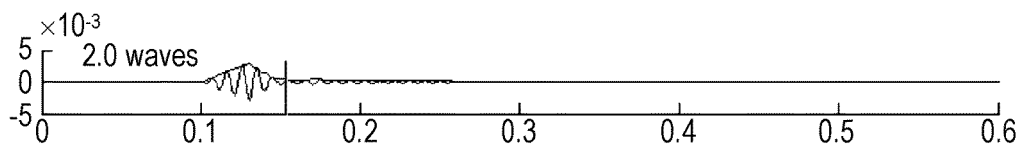
FIG. 7E is a diagram illustrating how the vibration of the touch panel changes according to the exemplary embodiment.
Figure 7F:
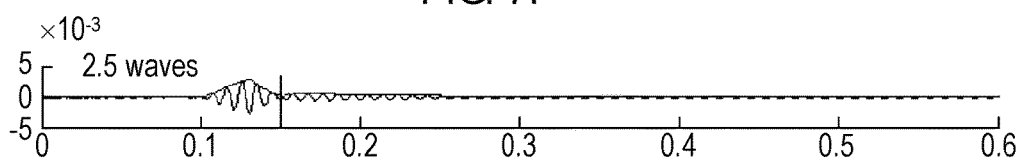
FIG. 7F is a diagram illustrating how the vibration of the touch panel changes according to the exemplary embodiment.
Figure 7G:
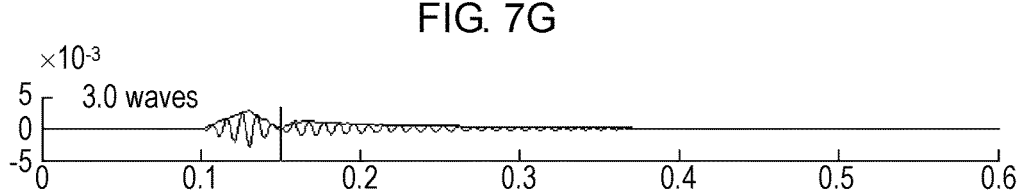
FIG. 7G is a diagram illustrating how the vibration of the touch panel changes according to the exemplary embodiment.

FIG. 7A illustrates the vibration of touch panel 11 when the number of waves of suppression signal 42 is zero waves. FIG. 7B illustrates the vibration of touch panel 11 when the number of waves of suppression signal 42 is 0.5 waves. FIG. 7C illustrates the vibration of touch panel 11 when the number of waves of suppression signal 42 is 1.0 wave. FIG. 7D illustrates the vibration of touch panel 11 when the number of waves of suppression signal 42 is 1.5 waves. FIG. 7E illustrates the vibration of touch panel 11 when the number of waves of suppression signal 42 is 2.0 waves. FIG. 7F illustrates the vibration of touch panel 11 when the number of waves of suppression signal 42 is 2.5 waves. FIG. 7G illustrates the vibration of touch panel 11 when the number of waves of suppression signal 42 is 3.0 waves.

Figure 8:
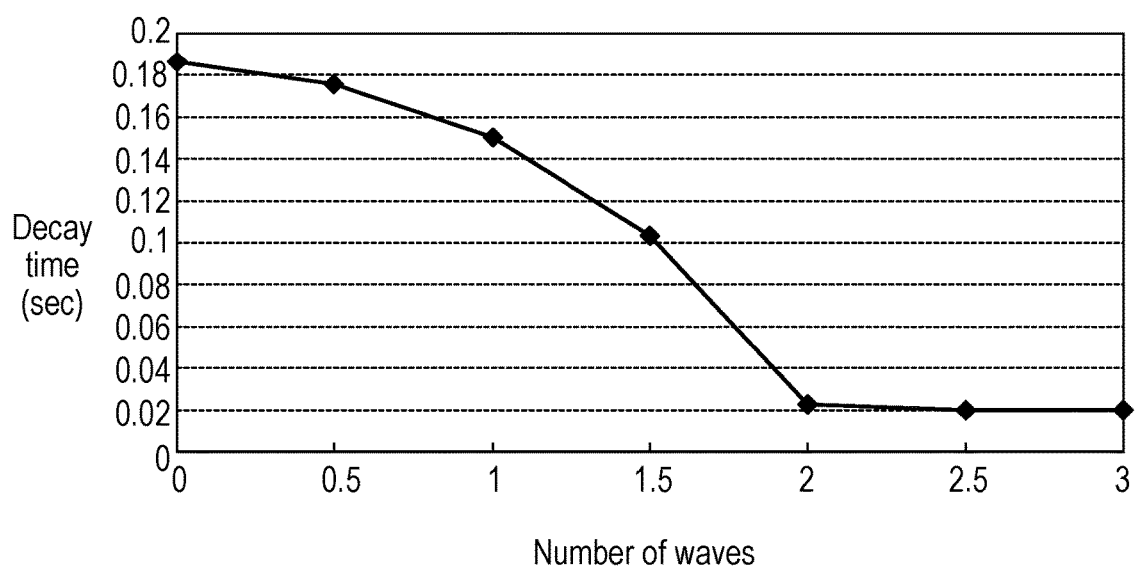
FIG. 8 is a diagram illustrating a relationship between a number of waves of a suppression signal and a decay time of the vibration of the touch panel when a number of waves of a drive signal is 3.0 waves according to the exemplary embodiment.

FIG. 8 is a diagram illustrating a relationship between the number of waves of suppression signal 42 and a decay time of the vibration of touch panel 11 when the number of waves of drive signal 41 is 3.0 waves according to the exemplary embodiment.

As can be understood from FIG. 7A to FIG. 7G and FIG. 8, in a case where the number of waves of drive signal 41 is 3.0 waves, if the number of waves of suppression signal 42 is 2.0 waves or more, the inertial vibration of touch panel 11 is attenuated effectively. However, too large a number of waves of suppression signal 42 now causes new vibration to be generated by suppression signal 42, as indicated by a comparison between FIG. 7E and FIG. 7G. Accordingly, for example, the number of waves of suppression signal 42 is set to be smaller than the number of waves of drive signal 41 so as to prevent generation of such new vibration. In the examples illustrated in FIG. 7A to FIG. 7G and FIG. 8, in a case where the number of waves of drive signal 41 is set to 3.0 waves, setting the number of waves of suppression signal 42 to 2.0 can prevent generation of new vibration while attenuating the inertial vibration effectively. Note that the above-described numbers of waves of drive signal 41 and suppression signal 42 are one example, and the numbers of waves are not limited to these numbers.

Next, the following describes an operation of generating suppression signal 42 so that a degree of suppression the inertial vibration may differ depending on the touch position of the user on touch panel 11.

Figure 9:
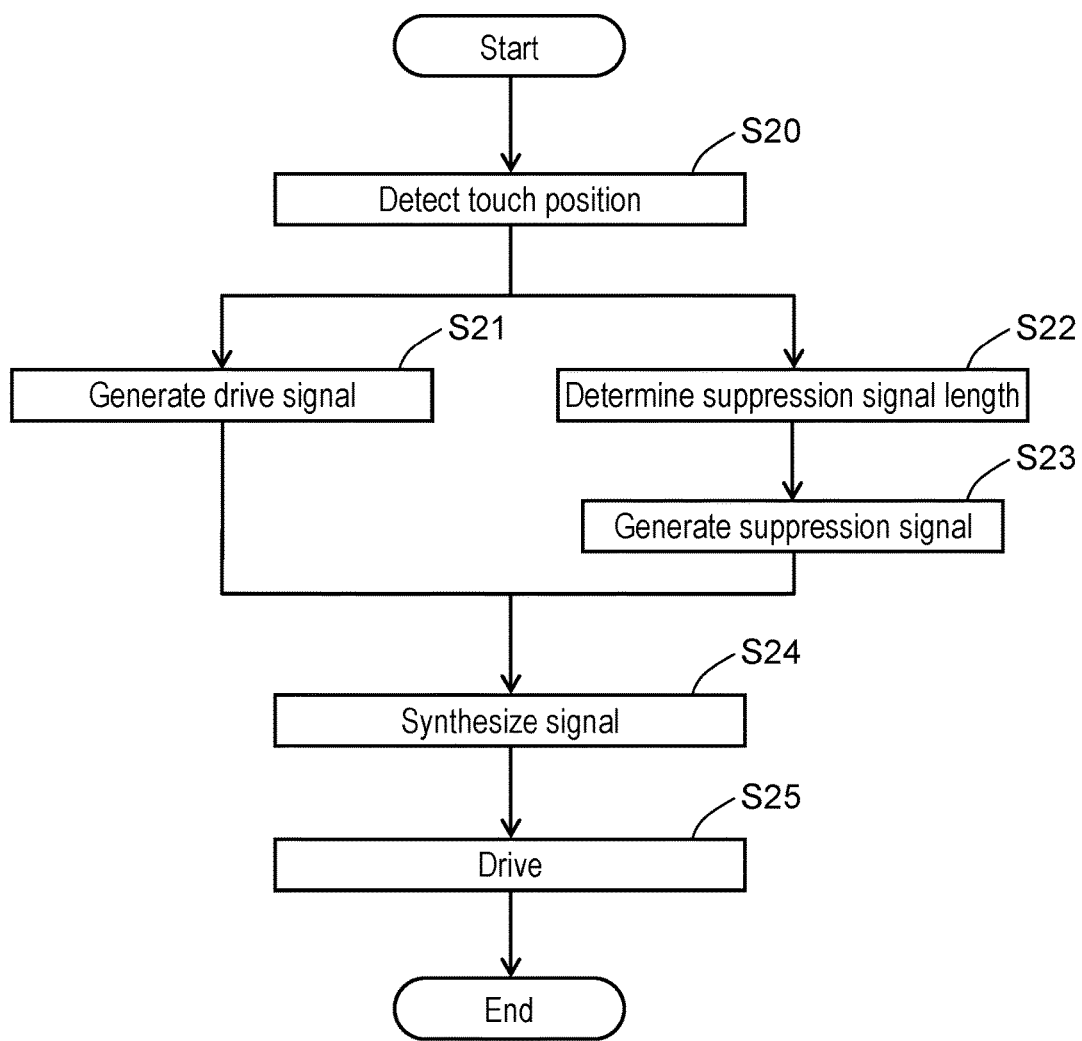
FIG. 9 is a flowchart illustrating the operation of the electronic device according to the exemplary embodiment.

FIG. 9 is a flowchart illustrating the operation of electronic device 10 according to the exemplary embodiment, and is a flowchart illustrating the operation of generating suppression signal 42 so that the degree of suppression the inertial vibration may differ depending on the touch position of the user on touch panel 11.

Figure 10A:
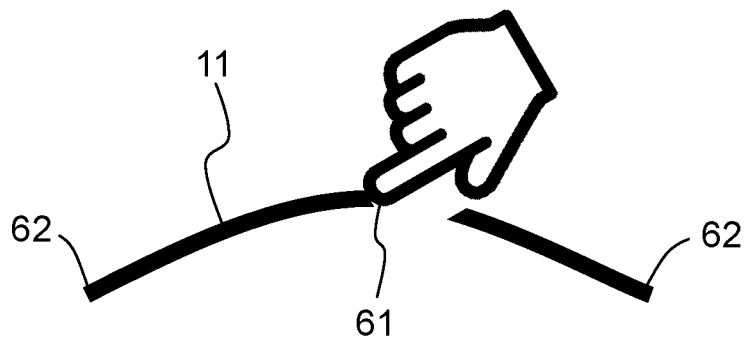
FIG. 10A is a diagram illustrating a manner in which a user touches a position near an antinode of the vibration of the touch panel according to the exemplary embodiment.
Figure 10B:
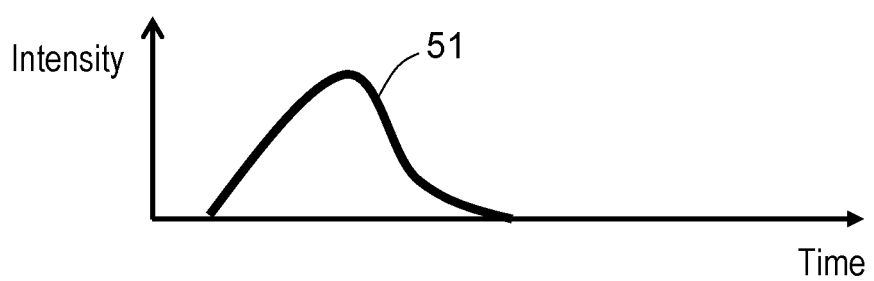
FIG. 10B is a diagram illustrating a change in the vibration of the touch panel when the user touches the position near the antinode of the vibration of the touch panel according to the exemplary embodiment.

FIG. 10A is a diagram illustrating a manner in which a user touches a position near antinode 61 of the vibration of touch panel 11 according to the exemplary embodiment, whereas FIG. 10B is a diagram illustrating a change in vibration 51 of touch panel 11 when the user touches the position near antinode 61 of the vibration of touch panel 11 according to the exemplary embodiment.

Figure 11A:
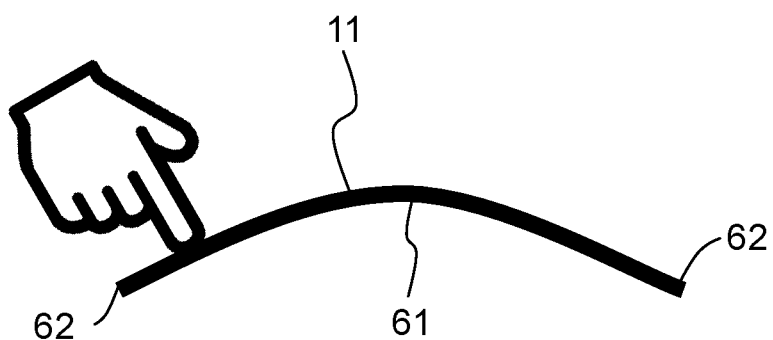
FIG. 11A is a diagram illustrating a manner in which the user touches a position near a node of the vibration of the touch panel according to the exemplary embodiment.
Figure 11B:
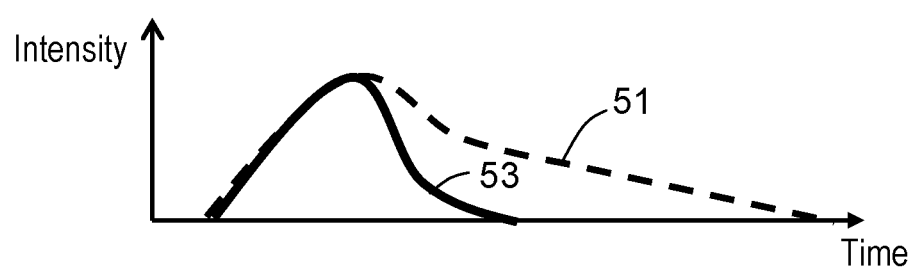
FIG. 11B is a diagram illustrating a change in the vibration of the touch panel when the user touches the position near the node of the vibration of the touch panel according to the exemplary embodiment.

FIG. 11A is a diagram illustrating a manner in which the user touches a position near node 62 of the vibration of touch panel 11 according to the exemplary embodiment, whereas FIG. 11B is a diagram illustrating a change in vibration 53 of touch panel 11 when the user touches the position near node 62 of the vibration of touch panel 11 according to the exemplary embodiment.

When touch panel 11 vibrates in a zeroth resonant mode, the amplitude may be large near a center of touch panel 11, and the amplitude may be small near an end of touch panel 11. A section with large amplitude of the vibration is called an antinode of the vibration, whereas a section with small amplitude of the vibration is called a node of the vibration.

In the examples illustrated in FIG. 10A and FIG. 11A, a section near the center of touch panel 11 is antinode 61 of the vibration with large amplitude. At this time, when the user touches the position near the center (near antinode 61) of touch panel 11 as illustrated in FIG. 10A, vibration 51 is suppressed by pressing force caused by the touch as illustrated in FIG. 10B, and thus the inertial vibration is also attenuated more quickly than in the examples illustrated in FIG. 11A and FIG. 11B. Accordingly, even if the number of waves of suppression signal 42 is smaller than the number of waves in the examples illustrated in FIG. 11A and FIG. 11B, the inertial vibration can be sufficiently suppressed. Alternatively, if the inertial vibration is sufficiently suppressed by the pressing force caused by the touch, suppression signal 42 may be unnecessary.

Meanwhile, as in the example illustrated in FIG. 11A, when the user touches the position near the end (near node 62) of touch panel 11, an effect of suppression the vibration of touch panel 11 by the pressing force caused by the touch is smaller than in the examples illustrated in FIG. 10A and FIG. 10B. Accordingly, as in vibration 51 illustrated in dashed line in FIG. 11B, the inertial vibration will continue for a longer time than in the examples illustrated in FIG. 10A and FIG. 10B. Accordingly, when the user touches the position near the end (near node 62) of touch panel 11, providing the larger number of waves of suppression signal 42 than in the examples illustrated in FIG. 10A and FIG. 10B enables effective suppression of the inertial vibration, as in vibration 53 illustrated in solid line in FIG. 11B.

Thus, when the user touches the position near the end (near node 62) of touch panel 11, it is possible to appropriately suppress the inertial vibration by generating suppression signal 42 with the larger degree of suppression the inertial vibration than in a case where the user touches the position near the center (near antinode 61) of touch panel 11. This allows, for example, uniform perception time of vibration at a plurality of the touch positions.

As illustrated in FIG. 9, when it is detected that the user touches touch panel 11, touch-panel controller 21 outputs information regarding the touch including the touch position to vibration controller 23 (step S20).

Based on the touch position detected in step S20, drive signal generator 31 generates drive signal 41 (step S21).

In addition, based on the touch position detected in step S20, suppression signal generator 32 determines a signal length (the number of waves) of suppression signal 42 (step S22).

For example, when the user touches the position near the end (near node 62) of touch panel 11 as described above, suppression signal generator 32 increases the number of waves of suppression signal 42. On the other hand, when the user touches the position near the center (near antinode 61) of touch panel 11, suppression signal generator 32 decreases the number of waves of suppression signal 42. One example of this operation will be illustrated with reference to FIG. 12A and FIG. 12B.

Figure 12A:
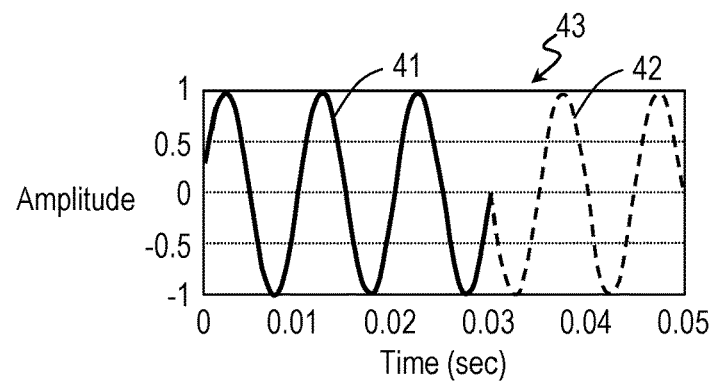
FIG. 12A is a diagram illustrating one example of the suppression signal according to the exemplary embodiment.
Figure 12B:
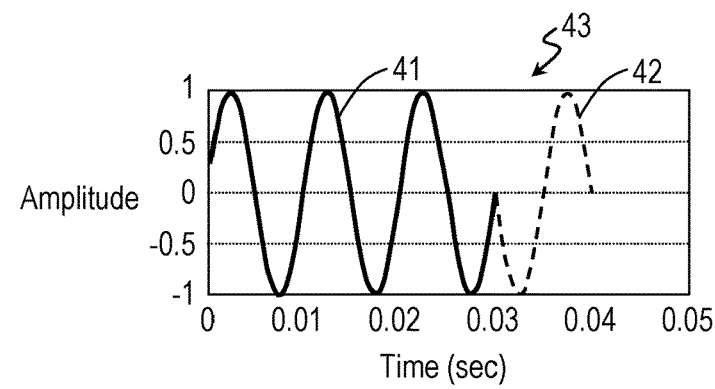
FIG. 12B is a diagram illustrating one example of the suppression signal according to the exemplary embodiment.

FIG. 12A and FIG. 12B are diagrams illustrating one example of suppression signal 42 according to the exemplary embodiment. FIG. 12A illustrates one example of suppression signal 42 when the user touches the position near the end (near node 62) of touch panel 11, whereas FIG. 12B illustrates one example of suppression signal 42 when the user touches the position near the center (near antinode 61) of touch panel 11. While the number of waves of suppression signal 42 is 2.0 waves in FIG. 12A, the number of waves of suppression signal 42 is 1.0 wave in FIG. 12B.

Next, suppression signal generator 32 generates suppression signal 42 according to the number of waves determined in step S22 (step S23).

Signal synthesizer 33 generates synthesized signal 43 obtained by synthesis of drive signal 41 and suppression signal 42, and then outputs synthesized signal 43 to vibrator 13 (step S24).

Vibrator 13 is driven by synthesized signal 43 generated in step S24 and vibrates, and the vibration propagates to touch panel 11, thereby presenting tactile feeling to the user (step S25).

Thus, by generating suppression signal 42 so that the degree of suppression the inertial vibration may differ depending on the touch position of the user on touch panel 11, the inertial vibration can be appropriately suppressed.

Although the number of waves of suppression signal 42 is changed depending on the touch position of the user on touch panel 11 in the above-described example, instead of changing the number of waves, amplitude of suppression signal 42 may be changed depending on the touch position. One example of this operation will be illustrated with reference to FIG. 12C.

Figure 12C:
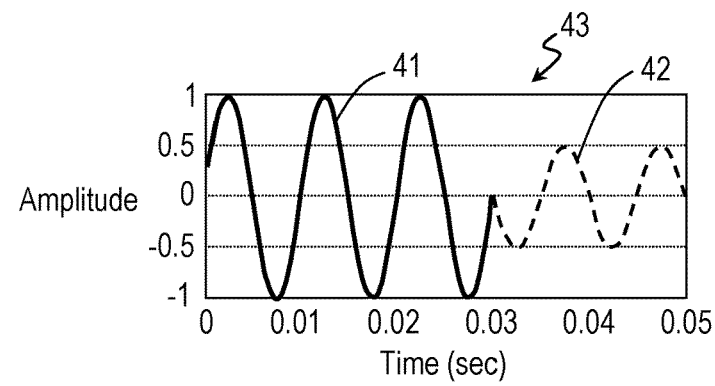
FIG. 12C is a diagram illustrating one example of the suppression signal according to the exemplary embodiment.

FIG. 12C is a diagram illustrating one example of suppression signal 42 according to the exemplary embodiment, illustrating one example of suppression signal 42 when the user touches the position near the center (near antinode 61) of touch panel 11. As compared with suppression signal 42 illustrated in FIG. 12A, the amplitude of suppression signal 42 illustrated in FIG. 12C is small.

In addition, a ratio of the amplitude of drive signal 41 to the amplitude of suppression signal 42 may be changed depending on the touch position. In the example illustrated in FIG. 12A, the ratio of the amplitude of drive signal 41 to the amplitude of suppression signal 42 is approximately 1:1, and the degree of suppression the inertial vibration is large. Meanwhile, in the example illustrated in FIG. 12C, the ratio of the amplitude of drive signal 41 to the amplitude of suppression signal 42 is approximately 2:1, and the degree of suppression the inertial vibration is small.

In addition, the phase of drive signal 41 and the phase of suppression signal 42 may be changed depending on the touch position. One example of this operation will be illustrated with reference to FIG. 12D.

Figure 12D:
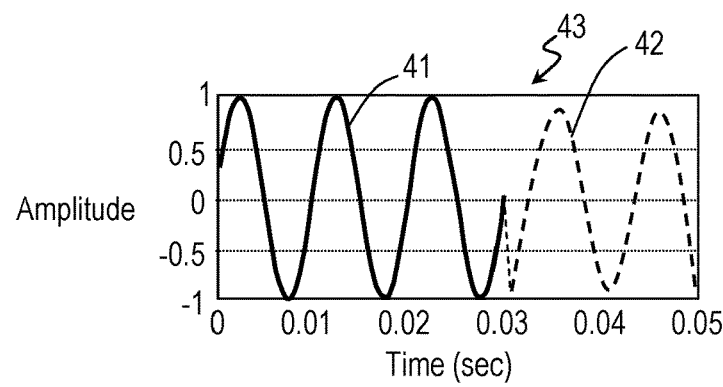
FIG. 12D is a diagram illustrating one example of the suppression signal according to the exemplary embodiment.

FIG. 12D is a diagram illustrating one example of suppression signal 42 according to the exemplary embodiment. For example, although the phase of drive signal 41 differs from the phase of suppression signal 42 by 180 degrees in FIG. 12A, the phase of drive signal 41 may differ from the phase of suppression signal 42 by 90 degrees as illustrated in FIG. 12D. For example, in a case where the touch position is close to node 62, the phase difference between drive signal 41 and suppression signal 42 may be closer to 180 degrees than in a case where the touch position is close to antinode 61.

Thus, the inertial vibration can be appropriately suppressed by a change in the amplitude and/or phase of suppression signal 42 depending on the touch position. Note that suppression signal 42 may be generated by a combination of the change in the number of waves, change in amplitude, and change in phase.

In addition, suppression signal 42 may be generated so that the degree of suppression the inertial vibration may differ depending on magnitude of force by which the user presses touch panel 11. In a case where the force of pressing touch panel 11 is relatively small, the effect of suppression the inertial vibration by the force of touch is smaller than in a case where the force of pressing touch panel 11 is relatively large. Accordingly, the inertial vibration can be appropriately suppressed by generation of suppression signal 42 with the relatively large degree of suppression the inertial vibration in a case where the force of pressing touch panel 11 is relatively small as compared with the case where the force of pressing touch panel 11 is relatively large.

In addition, suppression signal 42 may be generated so that the degree of suppression the inertial vibration may differ depending on a size of a contact area when the user touches touch panel 11. The contact area can be determined, for example, by detection of an area in which capacitance between an X electrode and a Y electrode of touch panel 11 changes. In a case where the contact area of the touch is relatively small, the effect of suppression the inertial vibration by the touch is smaller than in a case where the contact area of the touch is relatively large. Accordingly, in the case where the contact area of the touch is relatively small, the inertial vibration can be appropriately suppressed by generation of suppression signal 42 with the degree of suppression the inertial vibration larger than in the case where the contact area of the touch is relatively large.

Figure 13:
FIG. 13 is a diagram illustrating the electronic device installed in an automobile according to the exemplary embodiment.

In addition, electronic device 10 may be a touch input apparatus installed in an automobile. FIG. 13 is a diagram illustrating electronic device 10 installed in an automobile according to the exemplary embodiment. In an example illustrated in FIG. 13, electronic device 10 is installed in a so-called center console portion between a driver's seat and a passenger seat.

The user can use electronic device 10 to operate onboard equipment, such as car navigation apparatus 70, a car audio, an air conditioner, and the like.

Car navigation apparatus 70 is installed in the automobile. Electronic device 10 is communicatively connected to car navigation apparatus 70. Electronic device 10 receives a touch operation by a finger of the user. The user can use electronic device 10 to operate car navigation apparatus 70 and to cause car navigation apparatus 70 to perform navigation to a destination. In this way, even in a form in which electronic device 10 is mounted in the automobile, electronic device 10 is capable of providing the user with appropriate feeling of operation, by suppression the inertial vibration as described above.

Note that, in the example illustrated in FIG. 13, electronic device 10 and car navigation apparatus 70 are separate bodies, but electronic device 10 and car navigation apparatus 70 may be integrated to form one car navigation apparatus.

Other Exemplary Embodiments

As described above, the above-described exemplary embodiment has been described by way of example of a technique to be disclosed in the present application. However, the technique in the present disclosure is not limited to these, and changes, replacements, additions, omissions, etc. may be made to the exemplary embodiment as needed. In addition, it is also possible to combine various components described in the above exemplary embodiment as needed to make a new exemplary embodiment.

Hereinafter, other exemplary embodiments will be illustrated.

In the above-described exemplary embodiment, description is given mainly using a tablet type information terminal device as an example of the electronic device, but the electronic device is not limited to this example. The electronic device may be an electronic device that includes a touch panel, for example, a cellular phone, a personal digital assistant (PDA), a game machine, a car navigation system, ATM, etc.

In addition, in the above-described exemplary embodiment, the electronic device includes a display panel, but the electronic device does not need to include the display panel. The electronic device may be, for example, an electronic device such as a touch pad.

In the above-described exemplary embodiment, description is given by illustrating an example of the touch panel as an operation unit, but the operation unit is not limited to this example. The operation unit may be, for example, a pointing device like a mouse. In this case, vibrator 13 is provided in the mouse and vibrates the mouse.

In the above-described exemplary embodiment, an example of affixing the vibrator on the panel is illustrated, but the vibrator may be affixed to an enclosure, a frame, etc.

In the above-described exemplary embodiment, the vibrator is a piezoelectric element, but the vibration may be propagated by another method, such as an actuator by electrostatic force, a voice coil motor (VCM), a vibrating motor, and the like. In addition, a thin-film transparent piezoelectric member may be formed on the panel by a method such as sputtering and the like, to be used as the vibrator.

In addition, in the above-described exemplary embodiment, flexural vibration is illustrated as a type of vibration, but the vibration may be vibration caused by a wave of condensation and rarefaction, and a surface wave.

In the above-described exemplary embodiment, description is given with the touch panel and the display panel as separate bodies, but the touch panel and the display panel may be connected to each other by optical bonding, etc.

In the above-described exemplary embodiment, the touch panel and the display panel are separate components, but the touch panel and the display panel may be integrally formed. For example, the touch panel and the display panel may be integrally formed by methods such as an in-cell type touch panel that integrates a touch-panel function inside a liquid crystal panel, and an on-cell type touch panel that integrates the touch-panel function on a surface of the liquid crystal panel. In this case, the vibrator may be provided on a back of the display panel.

In addition, in the above-described exemplary embodiment, tactile feeling is presented to the user by occurrence of vibration, but the technique of the present disclosure is not limited to this example. In addition to vibration, tactile feeling may be presented to the user by other methods, for example, change in friction caused by static electricity, a stimulus on a skin caused by an electric current, change in a screen shape caused by a liquid, and the like. Not only presentation of tactile feeling but also screen display, sound, light, heat, etc. may be combined as needed.

In addition, the microcomputer may fulfill operations of at least one of the display controller, the touch-panel controller, and the vibration controller.

In addition, the above-described operations of the electronic device may be implemented by hardware, and may be implemented by software. A program that executes such operations may be stored in the storage, and may be stored in a built-in memory or read-only memory (ROM) of the microcomputer. In addition, such a computer program may be installed in the electronic device from a recording medium (such as an optical disc, a semiconductor memory, and the like) in which the computer program is recorded, and may be downloaded over electric telecommunication lines, such as the Internet and the like.

[1-3. Effect, etc.]

As described above, electronic device 10 according to one exemplary embodiment of the present disclosure includes a panel which a user touches, a detector configured to detect the touch of the user on the panel, vibrator 13 configured to vibrate the panel, and a signal generator. The signal generator generates a signal for driving vibrator 13, the signal including a drive signal that generates vibration of the panel and a suppression signal that suppresses inertial vibration of the panel. The suppression signal has a degree of suppression the inertial vibration that changes depending on a touch position detected by the detector. Note that in the present exemplary embodiment, touch-panel controller 21 is one example of the detector, vibration controller 23 is one example of the signal generator, and touch panel 11 is one example of the panel.

Electronic device 10 according to one exemplary embodiment of the present disclosure can reduce uncomfortable tactile feeling by suppression the inertial vibration of touch panel 11.

For example, vibration controller 23, which functions as the signal generator, may generate a signal for generating vibration of touch panel 11 so that the signal and the suppression signal may differ from each other in phase.

For example, vibration controller 23, which functions as the signal generator, may generate the suppression signal so that the degree of suppression the inertial vibration may differ depending on the touch position of the user on touch panel 11.

For example, vibration controller 23, which functions as the signal generator, may generate the suppression signal with amplitude that differs depending on the touch position of the user on touch panel 11.

For example, vibration controller 23, which functions as the signal generator, may generate a signal for generating vibration of touch panel 11 so that a ratio of amplitude of the signal to amplitude of the suppression signal may differ depending on the touch position of the user on touch panel 11.

For example, vibration controller 23, which functions as the signal generator, may generate the suppression signal with a number of waves that differs depending on the touch position of the user on touch panel 11.

For example, vibration controller 23, which functions as the signal generator, may generate a signal for generating vibration of touch panel 11 so that a difference between a phase of the signal and a phase of the suppression signal may differ depending on the touch position of the user on touch panel 11.

For example, in a case where the touch position of the user on touch panel 11 is closer to a node of vibration than to an antinode of vibration of touch panel 11, vibration controller 23, which functions as the signal generator, may generate the suppression signal with the larger degree of suppression the inertial vibration than in a case where the touch position of the user on touch panel 11 is closer to the antinode than to the node.

For example, in the case where the touch position of the user on touch panel 11 is closer to the node than to the antinode, vibration controller 23, which functions as the signal generator, may generate the suppression signal with the larger amplitude than in the case where the touch position is closer to the antinode than to the node.

For example, in the case where the touch position of the user on touch panel 11 is closer to the node than to the antinode, vibration controller 23, which functions as the signal generator, may generate the suppression signal with a larger amplitude ratio to a signal for generating vibration of touch panel 11 than in the case where the touch position is closer to the antinode than to the node.

For example, in the case where the touch position of the user on touch panel 11 is closer to the node than to the antinode, vibration controller 23, which functions as the signal generator, may generate the suppression signal with a larger number of waves than in the case where the touch position is closer to the antinode than to the node.

For example, in the case where the touch position of the user on touch panel 11 is closer to the node than to the antinode, vibration controller 23, which functions as the signal generator, may generate a signal for generating vibration of touch panel 11 so that a phase difference between the signal and the suppression signal may be closer to 180 degrees than in the case where the touch position is closer to the antinode than to the node.

For example, in a case where the touch position of the user on touch panel 11 is closer to an end than to a center of touch panel 11, vibration controller 23, which functions as the signal generator, may generate the suppression signal with the larger degree of suppression the inertial vibration than in a case where the touch position is closer to the center than to the end.

For example, in the case where the touch position of the user on touch panel 11 is closer to the end than to the center, vibration controller 23, which functions as the signal generator, may generate the suppression signal with the larger amplitude than in the case where the touch position is closer to the center than to the end.

For example, in the case where the touch position of the user on touch panel 11 is closer to the end than to the center, vibration controller 23, which functions as the signal generator, may generate the suppression signal with a larger amplitude ratio to a signal for generating vibration of touch panel 11 than in the case where the touch position is closer to the center than to the end.

For example, in the case where the touch position of the user on touch panel 11 is closer to the end than to the center, vibration controller 23, which functions as the signal generator, may generate the suppression signal with a larger number of waves than in the case where the touch position is closer to the center than to the end.

For example, vibration controller 23, which functions as the signal generator, may generate the suppression signal so that the degree of suppression the inertial vibration may differ depending on magnitude of force by which the user presses touch panel 11.

For example, in a case where force of pressing touch panel 11 is small, vibration controller 23, which functions as the signal generator, may generate the suppression signal with the larger degree of suppression the inertial vibration than in a case where the force of pressing touch panel 11 is large.

For example, vibration controller 23, which functions as the signal generator, may generate the suppression signal so that the degree of suppression the inertial vibration may differ depending on a size of a contact area of touch panel 11 which the user touches.

For example, in a case where the contact area of touch panel 11 which the user touches is small, vibration controller 23, which functions as the signal generator, may generate the suppression signal with the larger degree of suppression the inertial vibration than in a case where the contact area is large.

A vibration control apparatus according to one exemplary embodiment of the present disclosure includes: drive signal generator 31 configured to generate a drive signal that drives vibrator 13 for generating vibration of a panel which a user touches (touch panel 11); and suppression signal generator 32 configured to generate a suppression signal for suppression the inertial vibration of the panel. The vibration control apparatus outputs the drive signal and the suppression signal to vibrator 13. The suppression signal has a degree of suppression the inertial vibration that changes depending on a touch position of the user on the panel. Note that in the present exemplary embodiment, the vibration control apparatus is substantially identical to vibration controller 23.

A method according to one exemplary embodiment of the present disclosure is a method for vibrating a panel of electronic device 10 (touch panel 11). The method includes detecting a touch of a user on the panel, generating a signal for vibrating the panel, and vibrating the panel. The generated signal includes a suppression signal for suppression inertial vibration of the panel. The suppression signal has a degree of suppression the inertial vibration that changes depending on a touch position of the user on the panel.

A recording medium according to one exemplary embodiment of the present disclosure is a non-transitory computer-readable recording medium storing a computer program for causing electronic device 10 to execute a vibration operation. The computer program is a computer program for causing a computer of electronic device 10 to execute the steps of detecting a touch of a user on a panel of electronic device 10 (touch panel 11), generating a signal for vibrating the panel, and vibrating the panel. The generated signal includes a suppression signal for suppression inertial vibration of the panel. The suppression signal has a degree of suppression the inertial vibration that changes depending on a touch position of the user on the panel.

As described above, the exemplary embodiment has been described by way of example of the technique in the present disclosure. For this purpose, the accompanying drawings and detailed description have been provided. Therefore, the components described in the accompanying drawings and detailed description may include not only components essential for solving problems but also components unessential for solving problems, in order to illustrate the above-described technique. Therefore, it should not be acknowledged immediately that those unessential components be essential because those unessential components are described in the accompanying drawings and detailed description.

In addition, since the above-described exemplary embodiment is for illustrating the technique in the present disclosure, various changes, replacements, additions, omissions, etc. can be made within the scope of the appended claims and equivalents thereof.

The technique according to the present disclosure is particularly useful in a technical field in which tactile feeling is presented to the user's operation, and can be applied to apparatuses, for example, a mobile information terminal, a cellular phone, onboard equipment for a vehicle, a television, a digital still camera, a digital video camera, a personal computer, an electronic white board, a display for digital signage, and the like.

What is claimed is:

1. An electronic device comprising:
a panel which a user touches;
a detector configured to detect the touch of the user on the panel;
a vibrator configured to vibrate the panel; and
a signal generator configured to generate a signal for driving the vibrator, the signal including a drive signal that generates vibration of the panel and a suppression signal that suppresses inertial vibration of the panel,
wherein the suppression signal has a degree of suppression of the inertial vibration, the degree of suppression changing depending on a touch position detected by the detector.

2. The electronic device according to claim 1, wherein
the signal generator generates the drive signal that generates the vibration of the panel, and
the drive signal differs from the suppression signal in phase.

3. The electronic device according to claim 1, wherein the degree of suppression is controlled by amplitude of the suppression signal, the amplitude being different depending on the touch position of the user on the panel.

4. The electronic device according to claim 1, wherein
the signal generator generates the drive signal that generates the vibration of the panel, and
the degree of suppression is controlled by an amplitude ratio of the drive signal to the suppression signal, the amplitude ratio being different depending on the touch position of the user on the panel.

5. The electronic device according to claim 1, wherein the degree of suppression is controlled by a number of waves of the suppression signal, the number of waves being different depending on the touch position of the user on the panel.

6. The electronic device according to claim 1, wherein
the signal generator generates the drive signal that generates the vibration of the panel, and
the degree of suppression is controlled by a phase difference between the drive signal and the suppression signal, the phase difference being different depending on the touch position of the user on the panel.

7. The electronic device according to claim 1, wherein the degree of suppression differs depending on magnitude of force by which the user presses the panel.

8. The electronic device according to claim 7, wherein the degree of suppression, when the panel is pressed by small force is larger than the degree of suppression when the panel, is pressed by large force.

9. The electronic device according to claim 1, wherein the degree of suppression differs depending on a size of a contact area when the user touches the panel.

10. The electronic device according to claim 9, wherein the degree of suppression when the contact area is small is larger than the degree of suppression when the contact area is large.

11. The electronic device according to claim 1, wherein the degree of suppression, when the touch position of the user on the panel is closer to an end than to a center of the panel, is larger than the degree of suppression when the touch position is closer to the center than to the end.

12. The electronic device according to claim 11, wherein amplitude of the suppression signal, when the touch position of the user on the panel is closer to the end than to the center, is larger than the amplitude when the touch position is closer to the center than to the end.

13. The electronic device according to claim 11, wherein
the signal generator generates the drive signal that generates the vibration of the panel, and
an amplitude ratio of the suppression signal to the drive signal, when the touch position of the user on the panel is closer to the end than to the center, is larger than the amplitude ratio when the touch position is closer to the center than to the end.

14. The electronic device according to claim 11, wherein a number of waves of the suppression signal, when the touch position of the user on the panel is closer to the end than to the center, is larger than the number of waves when the touch position is closer to the center than to the end.

15. The electronic device according to claim 1, wherein the degree of suppression differs depending on which of an antinode of the vibration and a node of the vibration of the panel the touch position of the user on the panel is closer to.

16. The electronic device according to claim 15, wherein amplitude of the suppression signal when the touch position of the user on the panel is closer to the node than to the antinode, is larger than the amplitude when the touch position is closer to the antinode than to the node.

17. The electronic device according to claim 15, wherein the signal generator generates the drive signal that generates the vibration of the panel, and an amplitude ratio of the suppression signal to the drive signal, when the touch position of the user on the panel is closer to the node than to the antinode, is larger than the amplitude ratio when the touch position is closer to the antinode than to the node.

18. The electronic device according to claim 15, wherein a number of waves of the suppression signal when the touch position of the user on the panel is closer to the node than to the antinode, is larger than the number of waves when the touch position is closer to the antinode than to the node.

19. The electronic device according to claim 15, wherein the signal generator generates the drive signal that generates the vibration of the panel, and a phase difference between the drive signal and the suppression signal, when the touch position of the user on the panel is closer to the node than to the antinode, is closer to 180 degrees than the phase difference when the touch position is closer to the antinode than to the node.

20. A vibration control apparatus comprising:

a drive signal generator configured to generate a drive signal that drives a vibrator for generating vibration of a panel which a user touches; and a suppression signal generator configured to generate a suppression signal for suppression of inertial vibration of the panel, wherein the vibration control apparatus outputs the drive signal and the suppression signal to the vibrator, and the suppression signal has a degree of suppression of the inertial vibration, the degree of suppression changing depending on a touch position of the user on the panel.

21. A method for vibrating a panel of an electronic device, the method comprising:

detecting a touch of a user on the panel;

generating a signal for vibrating the panel; and vibrating the panel, wherein the generated signal includes a suppression signal for suppression of inertial vibration of the panel, and the suppression signal has a degree of suppression of the inertial vibration, the degree of suppression changing depending on a touch position of the user on the panel.

22. A non-transitory computer-readable recording medium storing a computer program for causing an electronic device to execute a vibration operation, the computer program being configured to cause a computer of the electronic device to execute:

detecting a touch of a user on a panel of the electronic device;

generating a signal for vibrating the panel; and vibrating the panel, wherein the generated signal includes a suppression signal for suppression of inertial vibration of the panel, and the suppression signal has a degree of suppression of the inertial vibration, the degree of suppression changing depending on a touch position of the user on the panel.

* * * * *